J. SLATTERY.
WHEEL FORGING MILL.
APPLICATION FILED JAN. 20, 1909.
1,107,717.
Patented Aug. 18, 1914.
2 SHEETS—SHEET 1.
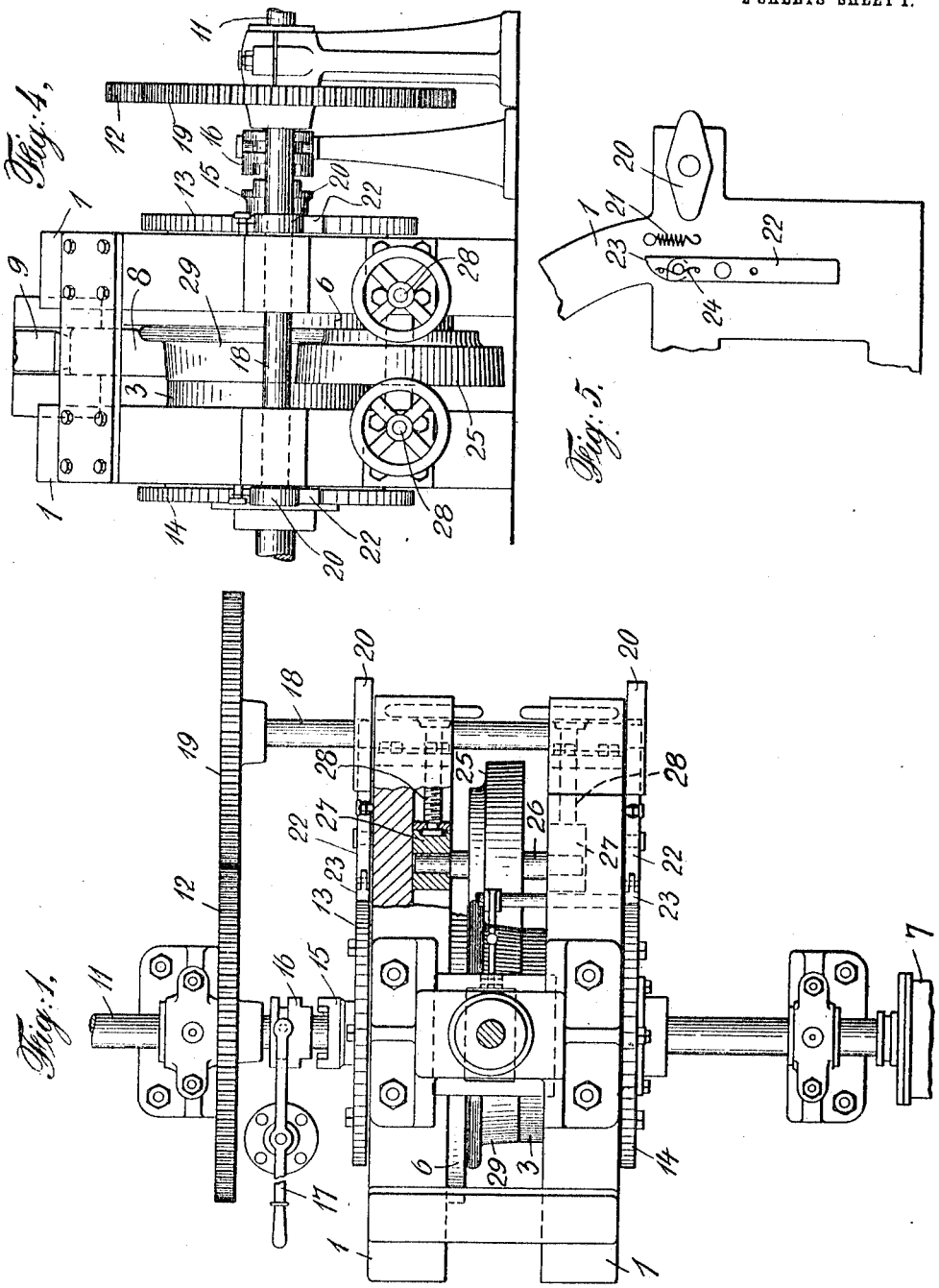

J. SLATTERY.
WHEEL FORGING MILL.
APPLICATION FILED JAN. 20, 1909.
1,107,717.
Patented Aug. 18, 1914.
2 SHEETS—SHEET 2.
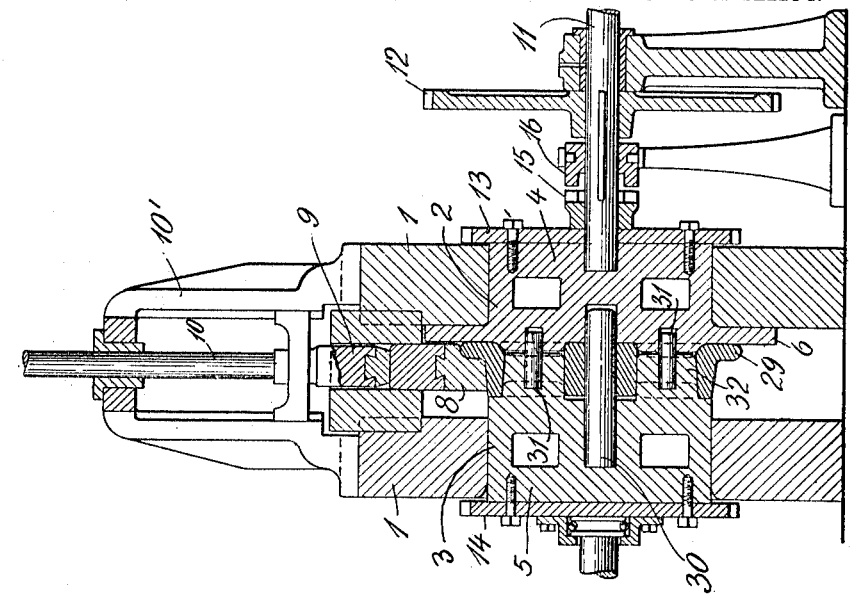
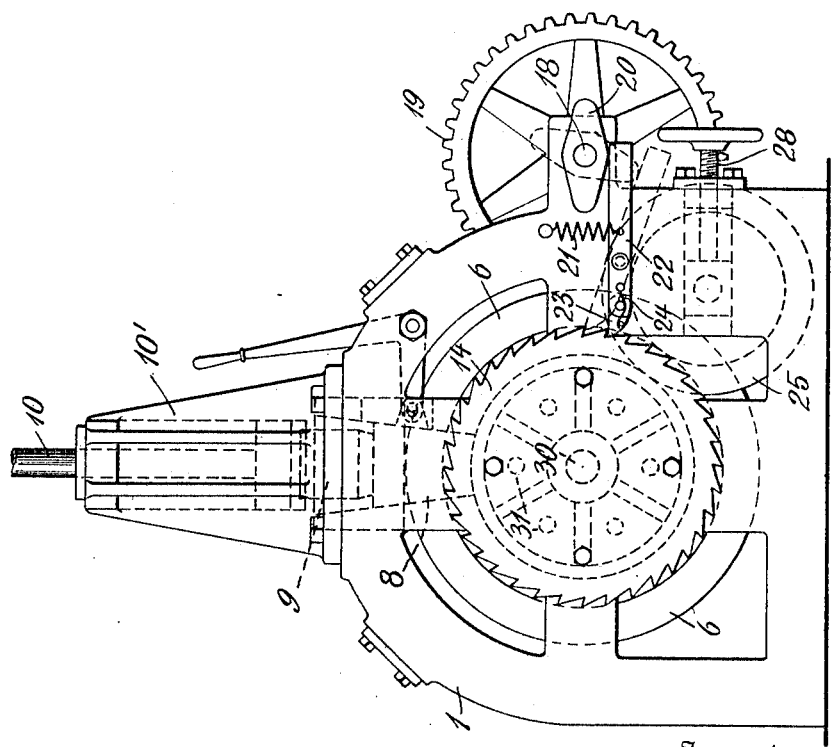
Witnesses:
Inventor
John Slattery
By his Attorneys

UNITED STATES PATENT OFFICE.

JOHN SLATTERY, OF CHROME, NEW JERSEY.

WHEEL-FORGING MILL.

1,107,717.        Specification of Letters Patent.        Patented Aug. 18, 1914.

Application filed January 20, 1909.   Serial No. 473,267.

*To all whom it may concern:*

Be it known that I, JOHN SLATTERY, a citizen of the United States of America, and a resident of Chrome, county of Middlesex, State of New Jersey, have invented a certain new and useful Wheel-Forging Mill, of which the following is a specification.

My invention relates to apparatus for forging car wheels and the like, and comprises in a single structure, means for first pressing a suitable blank between dies, thus compacting the metal to a considerable extent, closing "pipes", pores and the like, and reducing the width of the blank considerably; means for hammering the tread of the pressed blank, to harden, compact, and toughen the metal of the tread; and means for rolling the tread of the wheel to make it smooth and to make the wheel truly round.

My invention further comprises a novel mandrel for supporting the wheel during these various operations, said mandrel composed of two parts relatively interlocked for strength and rigidity, and being combined with dies for pressing the wheel. By separating the parts of this mandrel it is relatively easy to introduce a blank into the mill, the parts of the mandrel being brought together again when the blank is in place; and after the completion of the operations on the blank, the finished wheel may be removed by again separating the members of the mandrel.

It is very important that the tire or tread of a car wheel shall be of a very hard and tough steel. A tire of such material not only has greater inherent endurance that the best chilled cast iron, or than softer steel, but has far greater capacity to resist the formation of "flat spots", and so does not require truing as frequently as does the chilled iron or soft steel tread. Flat spots on the treads of car wheels are usually due to slipping of the wheel on the track after the application of the brake, and necessitate the removal of the wheel from the car and its truing up by grinding or turning down the tread of the wheel. Not only does this truing remove a considerable proportion of the material of the wheel rim, so reducing correspondingly the permissible mileage of the wheel, but it necessitates laying up the car for a considerable period of time, and considerable expense in machining and grinding; the total expenses from these causes and from the decreased mileage of the wheel being very considerable. By ordinary methods of forging or pressing steel wheels, it is impossible to produce a wheel having a rim or tread of the desired hardness, because the hub of the wheel must be of metal soft enough to permit the hub to be bored for the reception of the axle, and because a relatively soft grade of steel must be used to permit the extreme alteration of section involved in converting an ingot or billet into a forged or pressed car wheel. Such wheels being formed in one piece, are necessarily the same grade of steel throughout. The present invention, however, overcomes these difficulties in producing a one piece car wheel having a tread surface which is quite hard and very tough, while the hub portion is much softer. The increased hardness and toughness of the tread portion is due to the hammering which that portion of the wheel receives, as above referred to. It is well known that hammered steel surpasses steel of equal grade reduced to form by any other method, in density, hardness, toughness, and other desirable qualities. In these respects hammered steel is far superior to rolled steel.

My present invention provides a single structure wherein the operations required for forming a wheel having a hammered tread-surface, involving the pressing of the blank, the hammering of the tread, and the rolling of the wheel, may all be performed with one setting of the blank.

The object of my invention is to provide a simple, durable and easily operated apparatus by which all of the operations involved in forming a hammered wheel from a cast blank, may be performed with one setting of the blank.

In the accompanying drawings I illustrate one form of my said car wheel forging mill.

In said drawings: Figure 1 shows a top view and partial section of the mill; Fig. 2 shows a side elevation of the mill; Fig. 3 shows a detail central vertical section through the mandrel. Fig. 4 shows an end view of the mill; and Fig. 5 shows a detail side view of one of the stepping pawls and adjacent parts, the pawl being shown in the vertical or inactive position.

In the drawings, numerals 1, 1 designate massive upright frames and 2 and 3 designate parts of a mandrel adapted to support a wheel blank while the same is being forged; these members of the mandrel having hubs 4 and 5 respectively mounted for rotation in bearings in the uprights 1. Mandrel section 2 has a shoulder 6 bearing against the corresponding column 1 and enabling this mandrel member to resist a great pressure exerted axially; while mandrel member 3 is arranged to slide axially under the influence of suitable means, such as a hydraulic ram 7. The mandrel member 3 is made movable axially both to permit mounting the wheel blank upon the mandrel and to permit pressing of the wheel blank; for said blank, when first introduced, is somewhat broader than the final wheel.

Above the mandrel is located a hammer die 8, the face of which is shaped to correspond to the shape to be given to the wheel-tread; this die being mounted to slide up and down in guides provided between the uprights. This hammer die may be driven against the wheel tread in any suitable manner. I have illustrated for the purpose a hammer head 9 which may be considered to be the head of a steam hammer, of which 10 is the piston rod and 10′ the frame, said frame mounted on the uprights 1. I do not illustrate the complete steam hammer, as such hammers are well known.

11 designates a power shaft mounted in suitable bearings and arranged to be driven in any suitable manner. 12 designates a gear wheel mounted on this shaft, 13 a ratchet wheel concentric with said shaft but secured to the hub of the mandrel member 2, 14 designates a similar ratchet wheel secured to the hub of the mandrel member 3, and 15 and 16 designate respectively, the two jaw members of the jaw clutch, member 15 being secured to ratchet wheel 13 and member 16 being splined to and arranged to slide axially upon, shaft 11; suitable shifting means, such as the lever 17, being provided for shifting said clutch member.

18 designates a cam shaft mounted in bearings in the frame of the machine and arranged to be driven from gear 12 and shaft 11 by a gear wheel 19. Upon this shaft 18 are two cams 20 arranged together with springs 21, to actuate stepping pawls 22 by which ratchet wheels 13 and 14 may be advanced step by step. These pawls are pivoted to the frame of the machine, are arranged to be alternately depressed by their respective cams 20 and to be raised by their springs 21, and are provided with pivoted end pieces 23 adapted to engage the teeth of ratchet wheels 13 and 14 respectively. The pivotal connection of these end pieces 23 with the main portion of the pawls, is by a "knife" joint, which holds the end piece rigid with the pawl when said pawl is actuated by the cam to move the corresponding ratchet wheel, but which yields during the return movement of the pawl, so permitting said pawl to pass to the next ratchet tooth. These pawls are provided with springs 24 tending to hold the end pieces of the pawls as nearly as may be in line with the main portions of the pawls.

25 designates a roll having a peripheral contour adapted to produce, on the wheel blank, the desired contour of tread and flange. This roll is mounted upon a shaft 26 itself mounted in bearing blocks 27 mounted in guides in the uprights of the mill and arranged to be moved in and out by suitable means, as for example, screws 28.

29, in Figs. 1 and 3, designates the wheel after it has been compressed axially, hammered and rolled to proper form. This wheel is shown mounted on the two-part mandrel, mandrel member 3 having a central shaft 30 projecting through the hub hole of the wheel into a corresponding recess of mandrel member 2. Mandrel member 3 also has other projecting pins 31, of large size, fitting within suitable corresponding sockets in mandrel member 2, and so interlocking the two sections of the mandrel so that not only must said two sections rotate together, but that they form substantially a single structure to resist the blows of the hammer. The wheel indicated in the drawings is a spoked wheel, and therefore, to adequately support the rim of the wheel during the hammering and pressing, mandrel member 3 is provided with projections 32 adapted to project through the spaces between the spokes of the wheel.

The manner of forming a wheel in this mill is as follows: Member 3 of the mandrel having been withdrawn until its projecting center pin 30 is substantially flush with the inner face of the corresponding column 1 of the mill, a cast wheel blank is introduced between the members of the mandrel and centered with respect thereto, and then the mandrel member 3 is forced in again, forcing said blank upon the projections 32 of mandrel member 2, and at the same time forcing center pin 30 through the hub-hole of the wheel blank. The wheel blank when first introduced is considerably broader across its face than the finished wheel is to be, and when the said wheel blank has been mounted upon the mandrel as just described, the advance of the mandrel member 3 is continued, said mandrel member 3 and the corresponding member 2 acting as press dies to press the wheel axially, so reducing its width to that desired for the final wheel. During these operations the hammer block 8 has been raised clear of the wheel blank. The shaft 11 is now rotated, clutch 15—16 being opened, and the pawls 22 are caused to step the mandrel and wheel around, tooth by tooth, and at the same time the hammer die 8 is driven against the tread-surface of the wheel blank by repeated blows of the hammer, so compacting the metal of the wheel rim and giving it the tough fibrous texture of hammered steel. The hammer is so operated that its blows are delivered during the temporary intervals when the wheel blank is at rest. The rim of the wheel having been hammered sufficiently, the hammer and hammer block 8 are raised clear of the wheel, the pawls 22 are fastened in such position that they do not engage the teeth of the ratchet wheels 13 and 14, the clutch 15, 16 is closed and the mandrel and wheel blank are thereby caused to rotate, and then the roll 25 is advanced against the surface of the wheel blank by means of the screws 28 and is caused to roll the wheel so perfecting its form and making it truly circular. When sufficiently rolled the roll 25 is withdrawn, the mandrel member 3 drawn out, and the finished wheel is removed from the mandrel member 2.

It will be understood that the above operations are performed upon the wheel-blank while it is at a forging heat.

What I claim is:—

1. A wheel forging mill comprising in combination, in a single structure, means for rotatably supporting a blank comprising a two-part mandrel having its members relatively interlocked, said members constituting press dies adapted to compress the wheel blank axially, pressure means for forcing said dies together, means for hammering the periphery of the blank while in place on said mandrel and means for rolling the blank while in place on said mandrel.

2. A wheel forging mill comprising in combination, in a single structure, a frame, rotatable press dies mounted in bearings in said frame, pressure means for moving one of said dies axially to compress the wheel blank and means for hammering the periphery of a blank held by said dies.

3. A wheel forging mill comprising in combination, in a single structure, a frame, rotatable press dies mounted in bearings in said frame, pressure means for moving one of said dies axially to compress the wheel blank, means for hammering the periphery of a blank held by said dies, and means for rolling the blank.

4. A wheel forging mill comprising in combination, in a single structure, a frame, pressure dies rotatably mounted therein, one of said dies movable axially, pressure means for moving such axially movable die to press a blank between said dies, and means for hammering a blank held by said dies, said dies having interlocking portions strengthening them to resist the hammering.

5. A wheel forging mill comprising in combination means for rotatably supporting a blank, means for hammering the periphery of the blank, and step by step mechanism for rotating the blank, arranged to rotate the blank during the intervals between blows, and to permit said blank to remain stationary during the striking of the blows.

6. A wheel forging mill comprising in combination means for rotatably supporting a blank, means for hammering the periphery of a blank, and ratchet mechanism adapted to rotate said blank intermittently, arranged to rotate the blank during the intervals between blows, and to permit the blank to remain stationary during the striking of the blows.

7. A wheel forging mill comprising in combination means for rotatably supporting a blank, comprising a two-part mandrel, a frame in which the parts of said mandrel are mounted for rotation, ratchet wheels secured to said mandrel-sections, and pawls for rotating said mandrel sections step by step, and means for operating said pawls arranged to operate same to rotate the blank during the intervals between blows, and to permit the blank to remain stationary during the striking of the blows.

8. A wheel forging mill comprising in combination, in a single structure, a frame, rotatable press dies mounted in bearings in said frame, adapted to receive a blank between them and to compress the same axially, and thereafter act as a mandrel to hold said blank, means for rotating said dies, and hammering means supported and guided by said frame and arranged to act upon the periphery of a blank so held.

9. A wheel forging mill comprising in combination, in a single structure, a frame, rotatable press dies mounted in bearings in said frame, adapted to receive a blank between them and to compress the same axially, and thereafter act as a mandrel to hold said blank, step by step mechanism for rotating said dies, and hammering means supported and guided by said frame and arranged to act upon the periphery of a blank so held.

10. A wheel forging mill comprising in combination, in a single structure, a frame, rotatable press dies mounted in bearings in said frame, means for moving one of said dies axially to compress the wheel blanks, means for hammering the periphery of a blank held by said dies, a roll adapted to act against the periphery of a blank so held, and means for supporting said roll and for adjusting its position.

11. A wheel forging mill comprising in combination, in a single structure, a frame, rotatable press dies mounted in bearings in said frame, means for moving one of said dies axially to compress the wheel blanks, means for hammering the periphery of a blank held by said dies, a roll adapted to act upon the periphery of a blank so held, bearings for said roll movable in guides provided on said frame, and means for moving said bearings in and out.

12. A wheel forging mill comprising in combination means for rotatably supporting a blank comprising a two-part mandrel, means for hammering the periphery of the blank, a drive shaft, step by step mechanism for rotating the mandrel driven from said drive shaft, a clutch adapted to operatively connect said drive shaft and mandrel, and means for rolling the blank.

13. Coöperating wheel-forging dies adapted to together form a mandrel for the wheel-blank, comprising two dies adapted to press a wheel between them and having interlocking members whereby the two dies are interlocked when a wheel is held between them, the said members of one said die adapted to pass through openings in the wheel blank near the rim thereof and thereby to support the portions of the rim which are opposite said openings.

14. Coöperating wheel-forging dies adapted to together form a mandrel for the wheel-blank, comprising two dies adapted to press a spoked wheel between them, one of said dies having projections adapted to project through the spaces between the spokes of the blank and to support the portions of the wheel-tread which are opposite said spaces.

In testimony whereof I have signed this specification in the presence of two subscribing witnesses.

JOHN SLATTERY.

Witnesses:
H. M. MARBLE,
FRANK E. RAFFMAN.

---

Copies of this patent may be obtained for five cents each, by addressing the "Commissioner of Patents, Washington, D. C."